Figure 1:
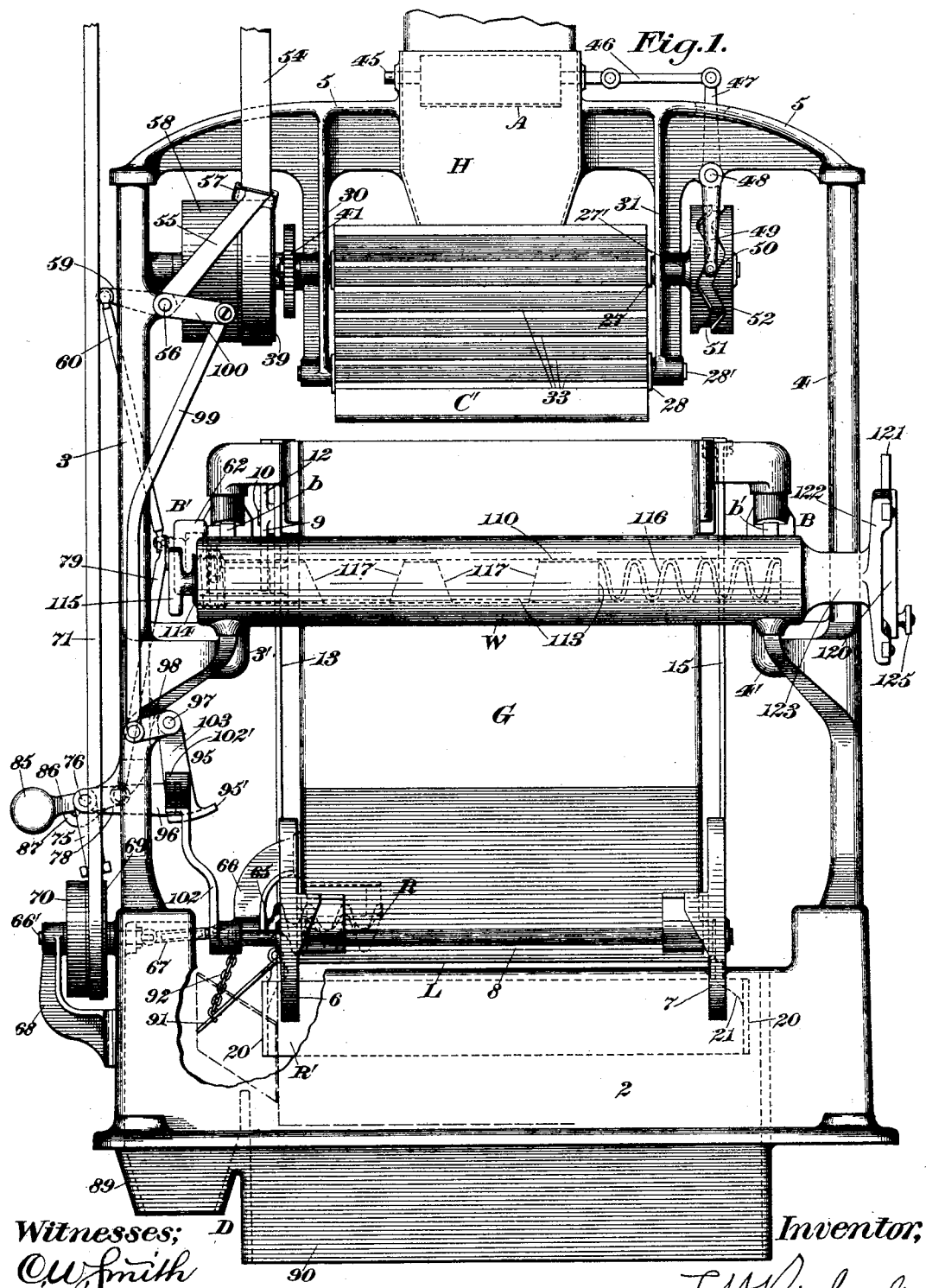

(No Model.) 4 Sheets—Sheet 1.

F. H. RICHARDS.
AUTOMATIC WEIGHING MACHINE.

No. 589,277. Patented Aug. 31, 1897.

Witnesses:
O. W. Smith
Fred. J. Dole.

Inventor,
F. H. Richards.

(No Model.) 4 Sheets—Sheet 2.

F. H. RICHARDS.
AUTOMATIC WEIGHING MACHINE.

No. 589,277. Patented Aug. 31, 1897.

Witnesses;
C. W. Smith
Fred. J. Dole.

Inventor;
F. H. Richards (No Model.) 4 Sheets—Sheet 3.

F. H. RICHARDS.
AUTOMATIC WEIGHING MACHINE.

No. 589,277. Patented Aug. 31, 1897.

Witnesses:
O. W. Smith
Fred. J. Dole.

Inventor:
F. H. Richards.

(No Model.) 4 Sheets—Sheet 4.

F. H. RICHARDS.
AUTOMATIC WEIGHING MACHINE.

No. 589,277. Patented Aug. 31, 1897.

Witnesses:
O. W. Smith
Fred. J. Dole.

Inventor:
F H Richards

UNITED STATES PATENT OFFICE.

FRANCIS H. RICHARDS, OF HARTFORD, CONNECTICUT.

AUTOMATIC WEIGHING-MACHINE.

SPECIFICATION forming part of Letters Patent No. 589,277, dated August 31, 1897.

Application filed April 20, 1897. Serial No. 633,026. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Weighing-Machines, of which the following is a specification.

This invention relates to weighing-machines for automatically weighing and delivering various kinds of granular and similar materials, and certain of the improvements are particularly adapted to machines of the class covered by Letters Patent No. 572,068, granted to me November 24, 1896.

With respect to one of its features the invention comprehends the provision of stream-supplying means for delivering to the load-receiver of the weighing mechanism an adequate quantity of material without waste or scattering, said means embodying a feed device consisting of two conveyers, of suitable kind, provided with blades, the blades of one conveyer being disposed between or overlapping those of the other conveyer, and instrumentalities being preferably furnished for intermittingly stopping said feed device, whereby it can intercept the passage of material to the load-receiver.

Another object is to furnish simple and effective means for balancing the load-receiver so that any variation in weight between the latter and the scale-beam or its counterpoise-weight may be quickly compensated for, and this result is accomplished by the insertion or placing in a bore or chamber of said scale-beam weight one or more poise-weights of convenient size, which are suitably held therein and which make up for any difference in weight of the load-receiver beyond that of the beam-weight, so that said load-receiver and beam can be balanced with exactness. By removing any one or more of said poise-weights a lighter load-receiver, or one of less capacity, can be mounted upon the beam without affecting the accuracy of the machine.

Another object is to furnish, in connection with the weighing mechanism, a device mounted to effect the removal of material therefrom, and a guide shiftably supported by the weighing mechanism and located to coöperate with said device, this feature of the invention being especially adapted to machines of the class referred to hereinbefore, said guide being operable to direct the material removed from the weighing mechanism into a suitable channel, and when actuated also to stop its passage to such channel on the emptying or discharge of the predetermined load.

Another object of the invention is to provide safety devices for preventing the action of any of the working parts of the machine except in a regular or determined order.

Figures 2, 5:
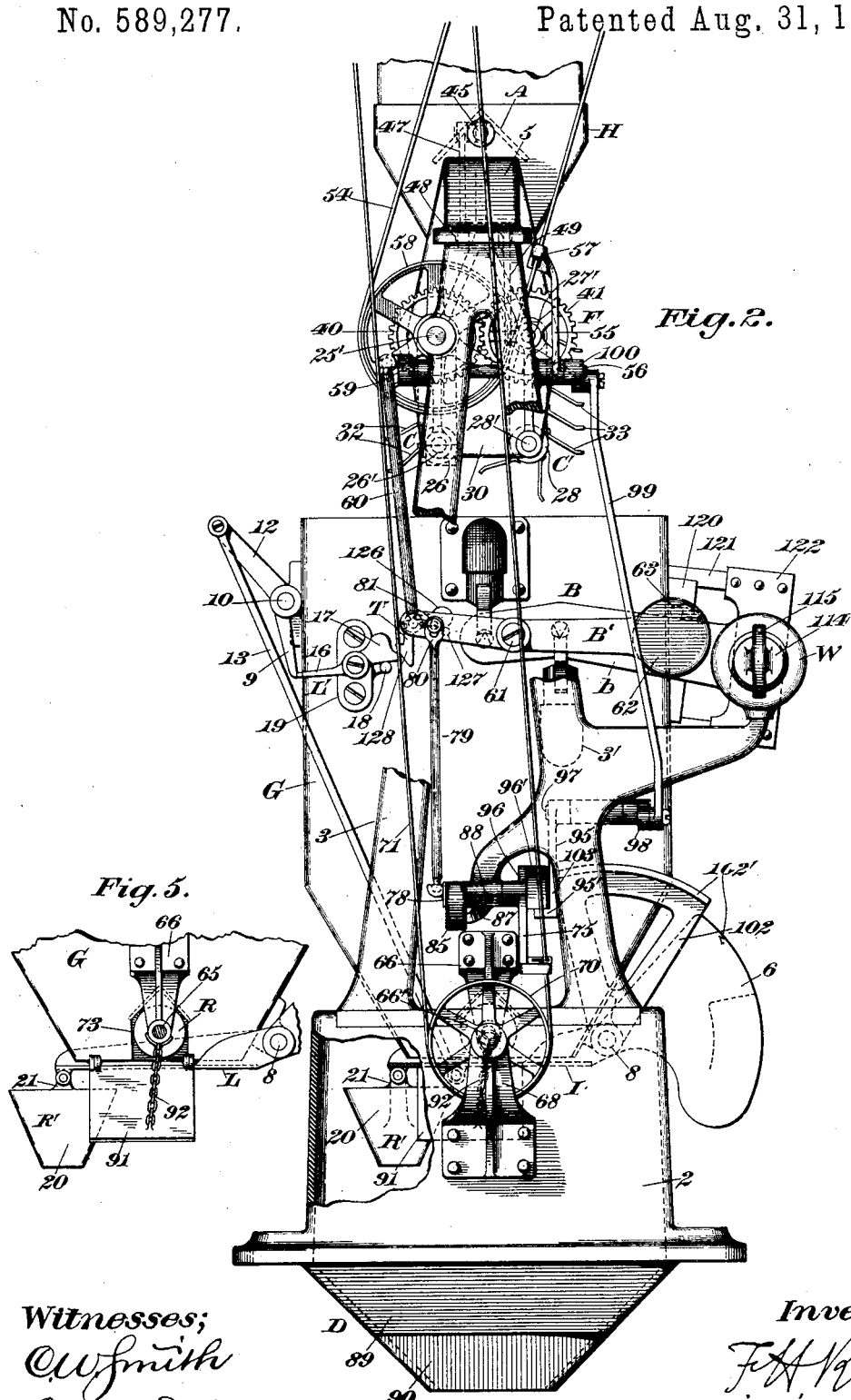
Figure 3:
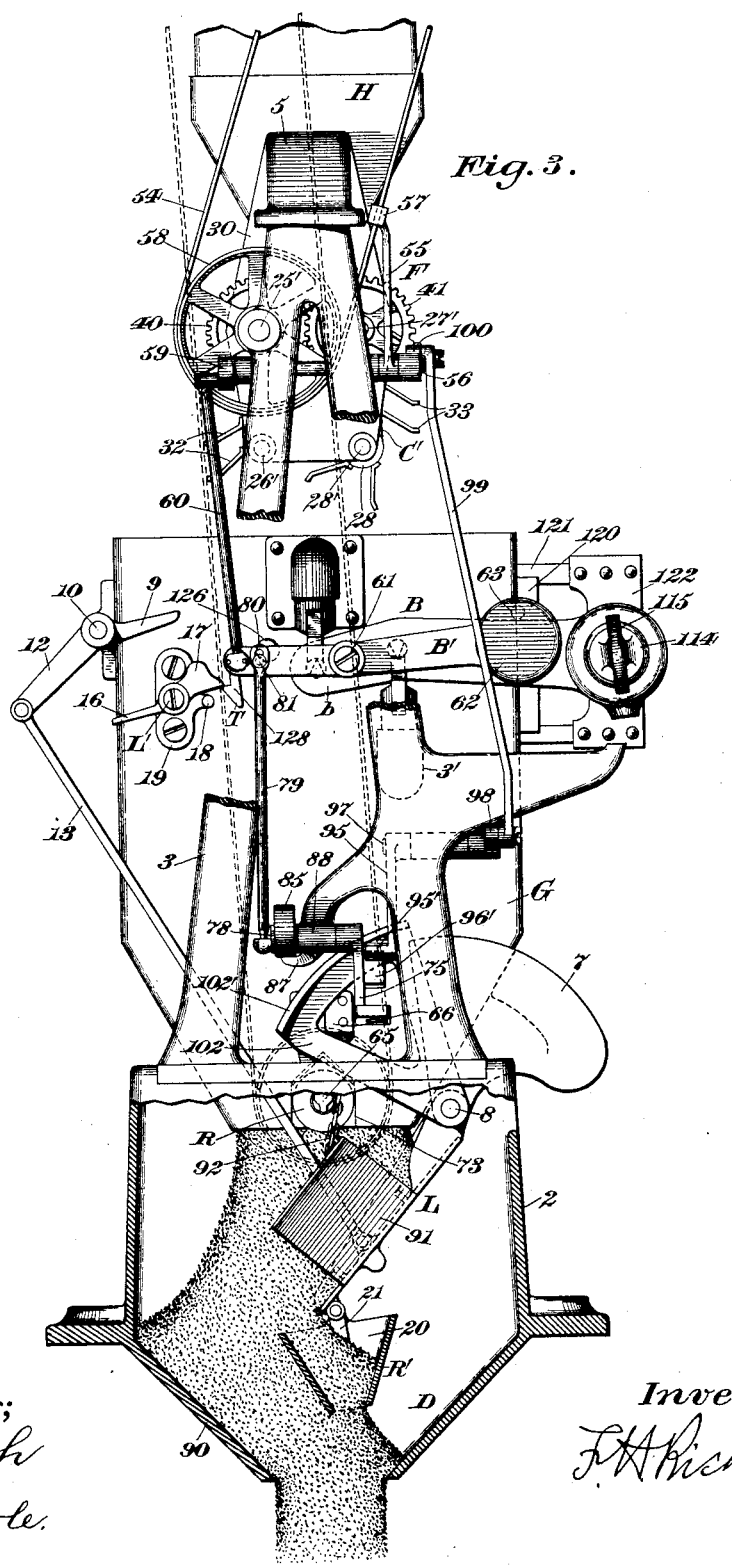
Figure 4:
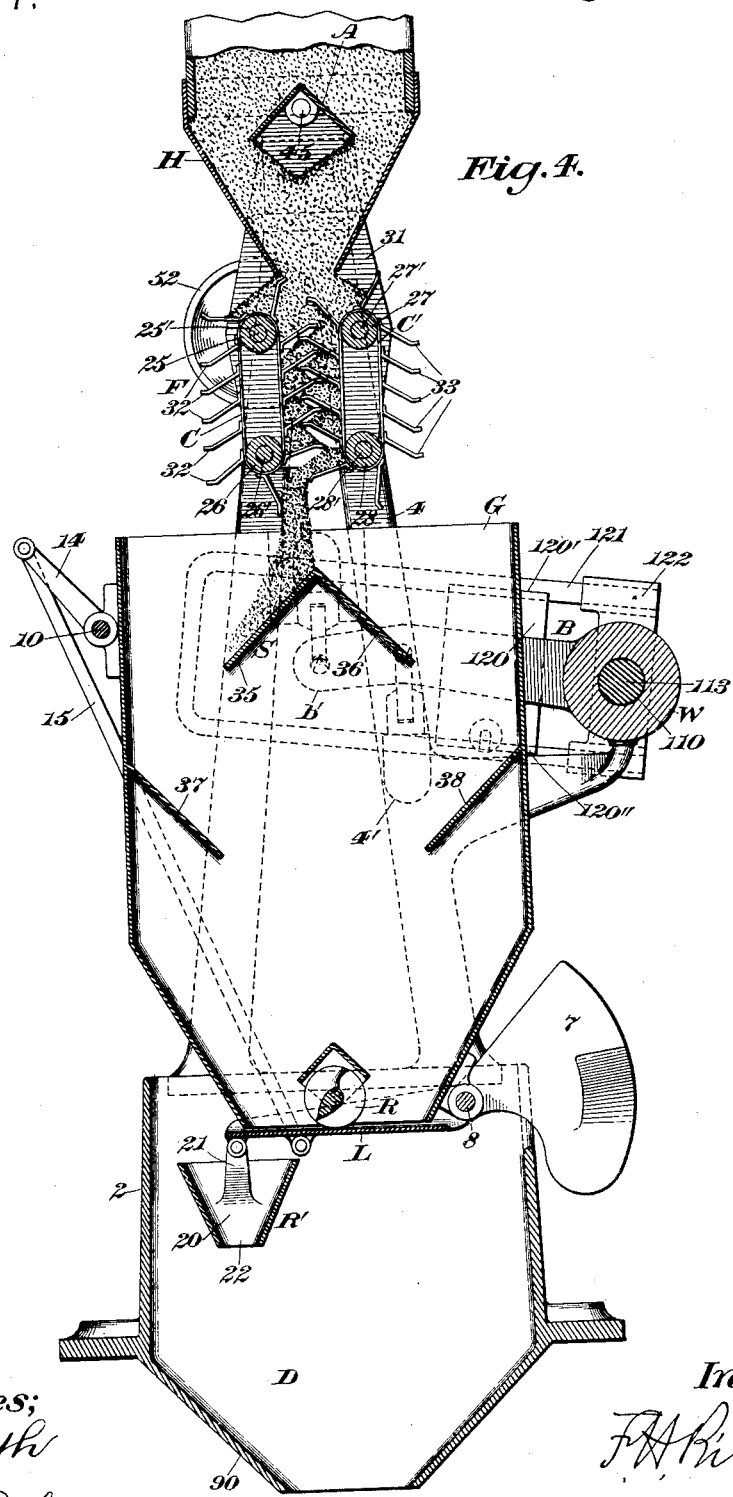

In the drawings accompanying and forming part of this specification, Figure 1 is a rear elevation of my improved weighing-machine. Figs. 2 and 3 are side elevations of the machine, as seen from the left in Fig. 1, illustrating the positions occupied by the several parts during the making and discharge of a load, portions of the framework being removed more clearly to illustrate certain features of the invention. Fig. 4 is a longitudinal central section of the machine; and Fig. 5 is a detail view in elevation of a fragment of the load-receiver, its closer, and adjacent parts.

Similar characters designate like parts in all the figures of the drawings.

The framework upon which the several parts of my improved machine are mounted may be of any ordinary or preferred construction, it comprising in the present case the hollow base or bed 2, the side frames or standards 3 and 4, and the top plate or beam 5, the latter surmounting said side frames and forming a convenient means for supporting the supply apparatus, and the several members of the framing can be connected together in any suitable manner.

The weighing mechanism may be of any suitable sort, it comprising in the present case the chambered or hopper-shaped load-receiver G and the counterweighted scale-beam B, mounted, preferably, upon the framework or on the brackets 3' and 4', extending inward from the two side frames 3 and 4, and the load-receiver being suspended from the inner ends of the beam-arms $b$ and $b'$, which features are substantially the same as illustrated in the Letters Patent hereinbefore alluded to.

The load-receiver G has in its lower end or under side a discharge outlet or opening, of suitable size, through which the loads of material can intermittingly pass, and said outlet is normally covered by a closer, which may be of any preferred form.

The closer is designated by L, and it consists of a flat plate, which, when in its normal position, is nearly in contact with the lower edge of the load-receiver, as indicated in Fig. 4, said closer being hinged to the load-receiver in some suitable manner for reciprocatory movement. The closer L has secured thereto the counterweighted end plates 6 and 7, which can be formed integral therewith and through which is passed the transverse rockshaft 8, mounted or journaled in suitable brackets on the rear wall of the load-receiver, the function of said counterweighted end plates being to return the closer to its shut position at the proper stage.

The instrumentalities for controlling the discharge of the load will preferably include as a part thereof a detent or latch, of suitable construction, the latch L', which is pivotally mounted upon the load-receiver, being preferably provided for this purpose, said latch being adapted to engage a member connected with the closer L, as the crank-arm 9, fixed to the rock-shaft 10, suitably supported on the upper forward side of the load-receiver, said shaft having a crank-arm 12, which is connected by the rod 13 with the closer L, said rod being pivoted to these parts. The shaft 10 has at its opposite end the crank-arm 14, connected with the closer L by the rod 15, which moves in unison with the rod 13. The working arm 16 of the latch L' is swung upward by the counterweighted arm 17 into engagement with the coöperating arm 9, the action of the latch being limited by the pin 18 on the bracket 19, to which the latch is pivoted. By lowering the arm 16 of the latch below the coöperating arm 9 the closer L will be released and, by reason of the weight of the mass supported thereon, will be promptly opened to discharge the load.

The closer constitutes one form of shiftable load-discharge member for the weighing mechanism, and in connection therewith I prefer to employ a regulator, of suitable construction, which is intended to retard the action of said closer, and preferably on the return stroke or shutting movement thereof, whereby sufficient time will be allowed to insure the complete emptying of the load-receiver. Said regulator is designated by R', and it consists of a receptacle preferably connected with the closer for swinging movement. The regulator-receptacle is of a length slightly exceeding the width of the closer, whereby it is adapted to hold a comparatively large quantity of material to impede the return movement of the closer. The end walls 20 of said receptacle are furnished with the vertical arms 21, which are pivoted to the closer L at or near the discharge edge thereof, whereby as the closer opens to effect the discharge of a load the regulator receptacle will be maintained substantially in an upright position, so that sufficient material can pour from the discharge edge of the closer to enter and nearly fill the receptacle.

For the purpose of delaying the discharge of the mass from the regulator-receptacle its delivery-outlet 22 (shown in Fig. 4) will be of reduced or small size, whereby the material will be retained in said receptacle, so that when it is filled, or nearly so, it is adapted to overbalance the counterweighted end plates 6 and 7 to hold the closer open or down, whereby every particle of material can run from said closer, and as the latter returns to its primary position the mass can gravitate through the delivery-outlet of the regulator-receptacle.

My present invention comprehends the provision of overloading and load-reducing means, preferably successively operative, and which parts may be of suitable type.

The overloading means is adapted to convey or deliver to the load-receiver a supply of material in excess of or beyond that determined for a true load or charge, the excess being subsequently removed, and for the purpose of insuring the rapidity of operation in weighing slow-running substances I prefer to employ the improved stream-supplying means shown, which includes as a part thereof a force-feeding device, which is designated by F, and which consists of two vertically-disposed conveyers of suitable construction, having blades, the blades of one conveyer being disposed between the blades of the other conveyer.

The feed device F is situated below the supply-hopper H, preferably secured to the top plate or beam 5, which is adapted to deliver from a suitable source of supply a stream of material to said feed device, which latter on its effective action is designed to convey the material to the load-receiver G to overload the same, said feed device being intermittingly stopped, or when the necessary overcharge has been received by the load-receiver.

The conveyers of the feed device are designated by C and C', respectively, they being of the "endless" type, the conveyer C being carried by the rolls 25 and 26 and the conveyer C' being carried by the rolls 27 and 28, the shafts 25', 26', 27', and 28' of said rolls being journaled in the bearings or hangers 30 and 31, which depend from the top plate or beam 5. The blades of the conveyer C are designated by 32, and those of the conveyer C' are denoted by 33, it being observed on an inspection of Fig. 4 that the blades of both conveyers, when on the inner runs thereof, overlap each other, whereby the feed device is adapted to carry a comparatively large quantity of material from the hopper H for delivery to the load-receiver, it being also evident that the blades prevent the material from the hopper from moving toward the outer run of the feed device.

It will be observed on an inspection of Fig. 4 that the blades of the two conveyers C and C' are oppositely inclined, whereby they are adapted when properly driven to deliver material in opposite directions.

The load-receiver G has therein, at a point below the feed device F, the stream-brake S, consisting of two oppositely-inclined plates or sections 35 and 36, the blades 33 of the conveyer C' being adapted, by reason of their inclinations, to deliver a mass of material to the brake-section 35; while the blades 32 are adapted to deliver their supply of material to the oppositely-inclined blade 36, the force of impact of the descending material being so modified as not to affect the accuracy of the work.

The load-receiver has therein a second pair of stream-brakes 37 and 38, respectively, oppositely disposed relatively to each other and to the two brake-sections 35 and 36, said brakes 37 and 38 secured to the front and rear walls of the load-receiver, whereby the momentum of the falling material will be further broken, the brake 37 being intended to receive the material from the brake-section 35 and the brake 38 being intended to receive the material from the brake-section 36.

Any suitable or convenient means can be employed for oppositely driving the conveyers C and C'; but I prefer to employ the following-described means, (illustrated in the drawings:) The shaft 25' at a suitable point carries a driver, which may be of any suitable type, such as the tight pulley 39, which can be keyed or otherwise secured to said shaft, the latter being preferably connected by gearing with the shaft 27' of the conveyer C', whereby said last-mentioned conveyer can be also operated. The shaft 25' is furnished with a gear 40, which meshes with a corresponding gear 41 on the shaft 27', said gears being preferably keyed to their respective shafts, whereby on the movement of the driver or pulley 39 the two conveyers C C' can be oppositely driven to conduct the proper quantity of material from the hopper H to overcharge the load-receiver G.

For the purpose of loosening up the supply in the hopper previous to its conduction therefrom by the feed device F, I provide an agitating device, such as A, the latter being in the form of a deflector and being adapted to modify the momentum of the supply prior to its entrance to the hopper. The agitating device or deflector A is angular, and at a point below its apex is suitably secured to the shaft 45, which works in suitable bearings in the end walls of the hopper H and has connected thereto the link 46, pivoted to the rock-arm 47 on the rock-shaft 48. The rock-shaft 48 is carried by the framework and has a second oppositely-disposed rock-arm 49, furnished with a projection 50 at the lower end thereof, disposed in the wave slot 51 on the cam-wheel 52, the latter being carried by the shaft 25'. On the movement of the shaft 25' the wheel 52 will be rotated so that the shaft 48, by reason of the rock-arm 49, can be rocked, and the agitating device or deflector A will be longitudinally reciprocated by reason of the intermediate device between the shaft 48 and deflector to loosen up the supply to such an extent as to insure its free passage to the feed device F.

The pulley 39 can be driven by a belt 54, connected with a suitable motor. (Not shown.)

The feed device F, as hereinbefore stated, constitutes a convenient means for delivering an overcharge to the load-receiver, and means of a suitable nature will be preferably provided for throwing said feed device out of action or stopping the same when the load-receiver is overcharged, a belt-shipping device, such as 55, constituting in the present case the means for accomplishing this object.

The belt-shipper 55 consists of a straight arm fixed to the rock-shaft 56 on the side frame 2, and it has the usual loop 57, through which the driving-belt 54 is adapted to run, said belt-shipper being controlled or operated by the weighing mechanism.

For shipping the belt 54 from the fixed pulley 39 to the loose pulley 58 on the shaft 25' the shaft 56 has affixed thereto at one end the crank-arm 59, to which is connected the longitudinal link 60, the latter being pivoted to the inner end of the auxiliary beam B', the connections between the link 60 and the crank-arm 59 and auxiliary beam B' being preferably universal joints.

The auxiliary beam B' consists of a counterweighted lever pivoted at 61 near the poising end of the beam-arm b, the weight 62 of said auxiliary beam being furnished with a stud or pin 63, which rests normally upon the adjacent main beam. On the descent of the poising ends of the main and auxiliary beams the link 60 will be drawn downward, thereby rocking the crank-arm 59 and rock-shaft 56, and hence oppositely swinging the belt-shipper 55, so that the belt 54 can be moved from the tight or fixed pulley 39 to the loose pulley 58, this operation being completed at about the time the load-receiver reaches the so-called "poising-line," the load-receiver being slightly overloaded by the feed device F, which moves for a short distance after the shipping of the belt. The return movement of the auxiliary beam B' with the main beam B will be blocked by interlocking stop mechanism, as will hereinafter appear; but on the release of said auxiliary beam its weight 62 will drop, the link 60 and the crank-arm 59 being thrust upward, so that the belt-shipper 55 can be actuated to shift the belt 54 from the loose pulley 58 to the fixed pulley 39 to again start the feed device F.

The load-reducing means in the present case consists of a positively-operated conveyer, such as R, which is shown as being of the "screw" type and as disposed within said load-receiver, the shaft 65 of said conveyer being journaled in the bearing or bracket 66 on one side of the load-receiver and being connected with a power-shaft 66' by a universal coupling device 67 of usual construction, whereby at the predetermined time the load-reducing conveyer R can be operated to remove the surplus or overcharge previously supplied by the feed device F.

The shaft 66' is supported by the base 2 and by a bracket 68 thereon, said shaft being furnished with the loose and tight pulleys 69 and 70, whereby when the belt, as 71, is on the pulley 70 the load-reducing conveyer R is driven to remove the overcharge or surplus from the load-receiver and to deliver the material withdrawn to a suitable channel through the load-reducing opening 73 in the lower edge of the load-receiver.

The shipper for the belt 71 is preferably controlled by the weighing mechanism, and means of a suitable nature are provided for maintaining the said belt on the loose pulley 69 until the load-receiver has reached the poising-line, it being evident that when the belt is shifted to the tight pulley 70 the conveyer R will be driven to force the surplus from the load-receiver.

The shipper for the belt 71 is designated by 75, and it is represented as an arm depending from a short rock-shaft 76, carried by the end frame 2, said belt-shipper having at its working end the usual loop through which the driving-belt 71 is adapted to travel.

The shaft 76 has thereon the rock-arm 78, connected by a universal joint of suitable kind to the rod 79, the latter having a loop 80 at its upper end, which embraces a pin or stud 81 on the auxiliary beam B', so that the weighing mechanism may descend to the poising-line without affecting the position of the belt-shipper 75. When, however, the poising-line is reached, the stud 81 will abut against the lower end of the loop and will force the rod 79 downward, this operation being a quick one, so that the shaft 76 can be rocked to swing the shipper 75 for moving the belt 71 from the loose pulley 69 to the fast pulley 70 to start the load-reducing device or conveyer R. On the movement of the latter it is adapted to deliver, through the opening 73, a quantity of material, which lightens the load-receiver and causes it to ascend until it reaches the poising-line, at which time the latch L' is tripped, as will hereinafter appear, to discharge the correct load.

The weight 85 on the arm 86 of the shaft 76 constitutes a suitable device for holding the belt-shipper 75 in its normal position to maintain the belt 71 in contact with the loose pulley 69, said arm resting on a suitable stop, as 87, on the hub 88.

It will be evident that when the rod 79 is forced downward by the auxiliary beam B' to shift the belt 71 to the tight pulley 70 the arm 86 will be raised above the stop 87, and that when the auxiliary beam B' is released the said weighted arm can drop to return the belt to the loose pulley.

There is illustrated at D a duplex discharge-hopper having the branches 89 and 90, said hopper being secured to the chambered base 2 below the weighing mechanism. The smaller branch of the discharge-conduit D is intended to receive the material removed from the load-receiver G by the conveyer R during the weighing of a load, while the larger conduit 90 is adapted to receive the predetermined charge, it being situated directly beneath the load-receiver.

In connection with the means for effecting the removal of the surplus or overcharge from the load-receiver during the weighing of a load I provide a guide, such as 91, supported by the weighing mechanism and consisting in the present case of a flat shifting plate pivoted to the closer L at a suitable point between its front and rear and being preferably connected with a suitable resistance member, as the bracket 66 on the load-receiver, a flexible connector, as a chain 92, being provided to connect said parts, and the chain may be attached to the guide-plate 91 and the bracket 66 in any suitable manner.

During the normal operation of the machine and during the removal of the surplus from the load-receiver the plate 91 will be inclined, as represented in full lines in Fig. 1, so as to direct the material withdrawn to the conduit 89, from whence it can be conducted to the supply-hopper H, if desired, in the manner shown in the Letters Patent hereinbefore referred to.

When the closer L is opened, as indicated by the dotted lines in Fig. 1 and the full lines in Fig. 3, the guide-plate will be shifted relatively to said closer, by reason of its connection with the resistance member or bracket 66, to prevent any material from running into the conduit 89, said plate being at this time inclined toward the closer.

Means operative with the feed device will be provided for holding the load-reducing conveyer out of action or ineffective during the supply of a load and for also holding the feed device ineffective when the discharge-conveyer is in action, and said means are represented consisting of the reciprocally-effective interlocking stops 95 and 96, which stops are of segmental form and have along their working edges the flanges 95' and 96', respectively. The stop 95 is fixed to the short rock-shaft 97 on the side frame 2, said shaft having at its opposite end the rock-arm 98, to which is pivoted the rod 99, attached to the rock-arm 100 on the shipper-shaft 56.

In Fig. 1 the flange 96' of the stop 96 is represented above and in contact with the coöperating flange 95' of the stop 95, so that the stop 96, and consequently the belt-shipper 75, will be held against action. When, however, the belt 54 is shifted from the tight pulley 39 to the loose pulley 58, the stop 95, by reason of its connections with the shipper 55, will be shifted to what is illustrated as the "left" to move the flange 95' across the plane of the inside face of the flange 96', whereby the stop 96, and consequently the shipper 75, are free to be operated, and when operated the inside face of the flange 96 will run substantially in contact with the inner end of the flange 95' to prevent retractive movement of the stop 95, and hence of the shipper 55, this relation continuing so long as the conveyer R is in motion.

In connection with the closer L a third stop is provided, it being adapted to coöperate with the stop 96, said stop being designated by 102 and being shown consisting of a flanged open segment fixed to an extended end of the rock-shaft 8, the flange of said stop 102 being designated by 102'.

The flange 102' during the normal operation of the machine will be in contact with the body portion 103 of the stop 95, as shown in Fig. 2, whereby the closer L will be held against opening movement so long as the feed device is in motion. When the stop 95 is shifted across the plane of the outer edge of the flange 102', the stop 102 can move as the closer swings open and said flange 102' will ride in contact with the inner edge of the body portion 103 of the stop 95, thereby to hold the latter in its shifted position.

It will be understood that the stop 102 on the opening of the closer L holds the stop 95 in its shifted position, (represented in Fig. 3,) and that during this period the load-receiver G and main beam B return to their initial positions, due to the lightening of the load-receiver, but the return of the auxiliary beam B' is prevented by reason of its intermediate connection with the interlocking stop 95.

It is a well-known fact that load-receivers of given capacities vary considerably in weight, due generally to thicknesses of certain parts thereof formed during the course of manufacture, and to compensate for this variation I provide in connection with the scale-beam a series of poise-weights insertible in a bore or chamber of the beam or counterpoise-weight to compensate for this variation. By inserting or removing any desired number of the poise-weights load-receivers of different capacities can be mounted on the scale-beam without affecting the balance of the weighing mechanism.

The scale-beam, as hereinbefore stated, may be of any suitable construction, it being shown herein consisting of two longitudinal arms $b$ and $b'$, joined at the rear by the chambered or bored counterweight W, the bore or chamber of which is designated by 110, it being permanently closed, as at 112, at one end.

The poise-weights are designated, respectively, by 113, and they are cylindrical in shape, suitable means being provided to hold said weights in place in the bore 110 of the weight W and against movement, whereby the balance of the mechanism cannot be disturbed.

For the purpose of inserting or removing the poise-weights there is seated in one end of the bore 110 the removable plug 114, which is in threaded engagement with the weight W, said plug being provided with the knob or handle 115, by which it can be turned in or out of the bore 110 of the weight.

Any suitable means may be provided for holding the poise-weights 113 in place, a protractile spring 116 being shown for this purpose, said spring being adapted to act, respectively, against the closed end 112 of the weight and against the poise-weights 113, as shown in Fig. 1; and to prevent said poise-weights from turning the meeting or adjacent edges thereof are beveled at 117, said bevel ends being in contact.

For the purpose of weighing out loads of different quantities I provide in conjunction with the scale-beam a load-weight, such as 120, which is carried by the auxiliary beam 121, the latter consisting of a rectangular frame, the inner ends of the two longitudinal members of which are secured in suitable tenons on the cross-piece 122, fixed to the projection 123 on the beam or counterpoise-weight W. One of the longitudinal members of the auxiliary beam will, in practice, be provided with suitable graduations. (Not shown.) By moving the load-weight 120 to either side of a zero or neutral point on the auxiliary beam 121 loads of any determined amount can be weighed out. The weight 120 may be furnished with suitable guideways, as 120' and 120'', (see Fig. 4,) to receive the longitudinal members of the auxiliary beam 121.

For holding the load-weight 120 in an adjusted position on the auxiliary beam the set-screw 125 may be utilized, it being adapted to engage the lower longitudinal member of said beam.

The tripper for the closer-holding latch is designated by T, and it consists of a by-pass of usual construction pivoted at the free end of the auxiliary beam B' and furnished with a weight, as 126, which normally rests upon the stop 127 on the auxiliary beam. The tripper is provided with the hook 128, which is adapted to engage under the weighted arm 17 of the latch L' on the ascent of the weighing mechanism and when the load is finished. At the commencement of operation the by-pass tripper is situated at a point above the latch L', and at about the time the load-receiver passes below the poising-line the tripper will be engaged by the weighted arm 17 of the latch and thrust to one side, whereby it can reach a point below the latch without moving the same. On the ascent of the load-receiver the hook 128 will raise the weighted arm 17 of the latch and lower the opposite arm 16 thereof, so that said arm is disengaged from the coöperating arm 9 to effect the release of the closer L, which is then forced open by the weight of the mass in the load-receiver G.

The operation of the hereinbefore-described machine, briefly stated, is as follows: Figs. 1 and 2 represent the positions occupied by the various parts at the commencement of operation, the load-receiver being empty and its closer L shut, and held in such position by the latch L', which engages the crank-arm 9 of the transverse rock-shaft 10. The driving-belt 54 being on the tight pulley 39, the feed device F will be driven, in the manner hereinbefore specified, to conduct from the hopper H a supply of material to the load-receiver to overload the same, and when a certain part of the overcharge has been received the load-receiver, and consequently the poising ends of the main beam B and the auxiliary beam B', will descend, so that said auxiliary beam, by pulling the rod 60 downward, will rock the shaft 56 and swing the shipper 55 to slowly move the belt 54 from the tight pulley 39 to the loose pulley 58, this last-mentioned operation being completed at about the time the load-receiver reaches the poising-line, sufficient material being conducted to the load-receiver to overload the same by the momentum of the feed device after the shipping of the belt. When the load-receiver reaches a point just below the poising-line, the rod or link 79 will be thrust downward, thereby rocking the shaft 76 and swinging the shipper 86, whereby the belt 71 will be slipped from the loose pulley 69 to the fast pulley 70, thereby to start the load-reducing conveyer R, which on such action will force from the load-receiver a quantity of material, which passes to the shifting guide-plate 91 and from thence into the branch 89 of the duplex hopper D. As the load-receiver lightens it will of course rise.

In Fig. 2 the by-pass tripper T is represented above the latch L', but when the load-receiver reaches the poising-line said tripper will engage the latch and will be thrust to one side, whereby it will pass below said latch, and on the ascent of the load-receiver and when the same reaches the poising-line the hook 128 of the tripper will engage the weighted arm 17 of the latch and lower the opposite arm 16 thereof and disengage said arm 16 from the crank-arm 9, thereby to release the closer L. When the closer is released, the mass in the load-receiver will force the same open, and the plate 91, being connected to the resistance member or bracket 66 through the medium of the chain 92, will be shifted relatively to the closer L to divert the material from the conduit 89 and toward the larger conduit 90, into which the load is discharged. When the mass is discharged from the closer, it enters the regulator-receptacle R', which retards the shutting of said closer, and when nearly all of the material has been emptied from the regulator the counterweighted end plates 6 and 7 will shut the closer, after which the other parts of the machine will return to their primary positions, when the operation will be repeated.

Having described my invention, I claim—

1. The combination of weighing mechanism embodying a load-receiver; a plurality of vertically-disposed conveyers having blades, the blades of one conveyer overlapping those of the other conveyer; and means controlled by the weighing mechanism for stopping the feed device when the load-receiver has received a predetermined quantity of material.

2. The combination, with weighing mechanism, of a hopper; a feed device comprehending two conveyers having blades, the blades of one conveyer being disposed between the blades of the other conveyer; and driving mechanism for said feed device, controlled by the weighing mechanism.

3. The combination, with weighing mechanism; of a feed device comprehending two conveyers having blades, the blades of one conveyer being disposed between the blades of the other conveyer; a shaft for one of the conveyers, carrying fast and loose pulleys and also provided with a gear; a meshing gear on the shaft of the other conveyer; a belt shiftable along said pulleys; and a belt-shipper operated by the weighing mechanism.

4. The combination of weighing mechanism embodying a load-receiver; a hopper; a plurality of vertically-disposed conveyers having inclined blades situated between the load-receiver and hopper, the blades of one of the conveyers overlapping the blades of the other conveyer; and means operative with the weighing mechanism for stopping said conveyers when the load-receiver has received a predetermined quantity of material.

5. The combination of weighing mechanism including a load-receiver; a hopper; a feed device situated between the hopper and the load-receiver and comprehending two conveyers having oppositely-disposed blades overlapping each other; a stream-brake situated in the load-receiver in line with the falling stream from the feed device and consisting of two oppositely-inclined sections; and means for stopping the feed device at a predetermined stage in the descent of the load-receiver.

6. The combination of weighing mechanism embodying a load-receiver having near its end a stream-brake consisting of two oppositely-inclined sections; coöperating and oppositely-disposed stream-brakes located below the first-mentioned stream-brake and secured inside the load-receiver; a supply-hopper; a feed device comprehending two vertically-disposed and oppositely-movable conveyers having overlapping blades extending obliquely therefrom; and means operative at a predetermined stage in the descent of the load-receiver for stopping said feed device.

7. The combination, with weighing mechanism, of a hopper; a deflector situated on said hopper; a shaft provided with a wheel having a peripheral cam-groove; a rock-shaft connected with the deflector; an arm secured to the rock-shaft and furnished with a projection located in the cam-groove; driving mechanism for said first-mentioned shaft; and means controlled by the weighing mechanism for throwing the driving mechanism out of operative relation with said first-mentioned shaft at a predetermined stage in the descent of the load-receiver.

8. The combination of weighing mechanism embodying a load-receiver; a hopper having a deflector therein; a feed device consisting of two coöperative vertically-disposed conveyers having overlapping blades; means for simultaneously operating the feed device and deflector; and automatically-operative means controlled by the weighing mechanism for stopping the motion of the deflector and feed device at a predetermined stage.

9. The combination, with weighing mechanism, of a feed device comprehending two conveyers having overlapping blades; a shaft; tight and loose pulleys mounted on said shaft; a rock-shaft provided with a belt-shipper; and an arm secured to said rock-shaft and connected with the weighing mechanism.

10. The combination, with weighing mechanism including a load-receiver provided with a closer, of a conveyer; a shaft; tight and loose pulleys mounted on said shaft; a belt shiftable from one of the pulleys to the other; a rock-shaft provided with an arm connected with the weighing mechanism; a conveyer mounted on the load-receiver; a shaft connected with said last-mentioned conveyer and provided with fast and loose pulleys; a belt shiftable from one of the pulleys to the other; a shipper for the last-mentioned belt; a stop connected with one of said shippers; and a coöperating stop connected with the closer.

11. The combination of a load-receiver provided with a closer, the load-receiver having a load-reducing opening; a plate connected with said closer; and a resistance member connected with said plate, whereby on the opening of the closer the plate will be shifted relatively thereto.

12. The combination of a load-receiver provided with a closer; a load-reducing conveyer carried by the load-receiver and operative when driven to force a stream of material through an opening in the load-receiver; a plate attached to the closer; and a resistance member connected with the plate.

13. The combination of weighing mechanism embodying a load-receiver provided with a closer, the load-receiver having a load-reducing opening; load-reducing means; a plate pivoted to the closer; and a resistance member connected with the plate.

14. The combination of weighing mechanism; a resistance member; a device mounted to effect the removal of material from the weighing mechanism; and a guide shiftably supported by the weighing mechanism and connected with said resistance member.

15. The combination of weighing mechanism including a load-receiver; a conveyer carried by the load-receiver; a shaft for said conveyer; a bracket; a shifting guide coöperative with the conveyer; and a connection between said shifting guide and bracket.

16. The combination of weighing mechanism embodying a load-receiver provided with a closer; overloading and load-reducing means; a surplus-receiving device; a guide-plate pivoted to the closer and in position to deliver the surplus removed from the load-receiver by the load-reducing means into said surplus-receiving device; and mechanism for shifting the guide-plate relatively to the closer on the opening of the latter.

17. The combination of weighing mechanism including a load-receiver provided with a closer; a duplex discharge-hopper situated below the weighing mechanism; overloading and load-reducing means; a plate connected with the closer; and a resistance member connected with said plate.

18. The combination, with weighing mechanism including a shiftable load-discharge member, of a regulator-receptacle shiftably connected with said load-discharge member.

19. The combination, with weighing mechanism including a load-receiver provided with a closer, of a regulator-receptacle shiftably connected with the closer and adapted to receive a part of the mass discharged from the load-receiver.

20. The combination, with weighing mechanism including a load-receiver provided with a closer, of a swinging regulator-receptacle supported by the closer and adapted to receive a part of the mass discharged from the load-receiver.

21. The combination, with weighing mechanism including a load-receiver provided with a closer, of a movably-mounted regulator-receptacle connected to the closer adjacent to its discharge edge for swinging movement.

22. The combination, with weighing mechanism including a load-receiver provided with a closer, of a movably-mounted regulator-receptacle connected with the closer and having a reduced discharge-outlet.

23. The combination, with weighing mechanism including a load-receiver provided with a closer, of a regulator-receptacle having arms at its opposite ends pivoted to the closer.

24. The combination, with a load-receiver, of a supporting scale-beam therefor the weight of which has a bore; a series of weights insertible in the bore; and means for holding said weights against longitudinal movement.

25. The combination, with a load-receiver, of a supporting scale-beam therefor the weight of which has a bore; a series of weights insertible in said bore; and a spring adapted to act against said weights.

26. The combination, with a load-receiver, of a supporting scale-beam therefor the weight of which has a bore permanently closed at one end; a series of beveled weights insertible in said bore; and means for holding said weights against longitudinal movement.

27. The combination, with a load-receiver, of a supporting scale-beam therefor the weight of which has a bore; a series of weights insertible in said bore; means for holding the weights against longitudinal movement; an auxiliary beam connected with said beam-weight; and a load-weight carried by the auxiliary beam, for sliding movement.

28. The combination, with a load-receiver, of a supporting scale-beam therefor the weight of which has a bore permanently closed at one end; a series of weights insertible in said bore; a spring situated in said bore and adapted to act against one of the weights; a removable plug seated in one end of the bore; an auxiliary beam secured to said beam-weight; and a sliding load-weight carried by said auxiliary beam.

FRANCIS H. RICHARDS.

Witnesses:
F. N. CHASE,
ANDREW FERGUSON.